United States Patent [19]
Boaz

[11] Patent Number: 5,380,348
[45] Date of Patent: Jan. 10, 1995

[54] METHOD FOR TREATING GLASS SHEETS ON A GAS HEARTH

[75] Inventor: Premakaran T. Boaz, Livonia, Mich.

[73] Assignee: Ford Motor Company, Dearborn, Mich.

[21] Appl. No.: 78,333

[22] Filed: Jun. 21, 1993

[51] Int. Cl.⁶ .......................................... C03B 23/035
[52] U.S. Cl. ...................... 65/25.2; 65/25.4; 65/103; 65/104; 65/107; 65/114; 65/182.2
[58] Field of Search ............... 65/25.2, 25.4, 103, 65/107, 111, 114, 182.2, 273, 349, 104

[56] References Cited

U.S. PATENT DOCUMENTS

| | | | |
|---|---|---|---|
| 3,084,526 | 4/1963 | Richardson | 65/111 |
| 3,223,501 | 12/1965 | Fredley et al. | 65/25 |
| 3,332,759 | 7/1967 | McMaster et al. | 65/25 |
| 3,482,954 | 12/1969 | Yuen | 65/160 |
| 3,634,057 | 1/1972 | Tate et al. | 65/182.2 |
| 3,862,828 | 1/1975 | Ritter et al. | 65/107 |
| 4,059,426 | 11/1977 | Starr | 65/25 |
| 4,059,427 | 11/1977 | Starr et al. | 65/25 |
| 4,119,424 | 10/1978 | Comperatore | 65/107 |
| 4,261,723 | 4/1981 | Hargrave | 65/114 |
| 4,871,385 | 10/1989 | Lecourt et al. | 65/115 |
| 4,946,523 | 8/1990 | Meussner | 156/64 |

Primary Examiner—Joye L. Woodard
Attorney, Agent, or Firm—Lorraine Melotik; Roger L. May

[57] ABSTRACT

Apparatus operable in accordance with the method of the present invention is provided for selectively cooling areas of a glass sheet during heating in the lehr in order to eliminate hot spots and minimize undesirable sagging of portions of the glass sheet. The apparatus includes a gas hearth block upon which the glass sheet is supported during heating and an air nozzle or air nozzles connected to a source of compressed room temperature air located over those areas of the glass sheet that tend to develop hot spots. The air nozzle or air nozzles blow cooler air onto those selected areas of the glass sheet and even out the temperature of the heated glass sheet. This may be done prior to forming and/or tempering the glass sheet. The method and apparatus of the present invention is particularly useful with automobile glazings, such as sidelights and rear windows, bearing peripheral dark banding which show an increased tendency to sag during heating, particularly at the top edge portions.

8 Claims, 2 Drawing Sheets

METHOD FOR TREATING GLASS SHEETS ON A GAS HEARTH

BACKGROUND OF THE INVENTION

The present invention relates to a method and apparatus for selectively cooling areas of glass sheets during heating in the lehr in order to minimize undesirable sagging of portions of the glass sheet, particularly top edge portions bearing dark banding.

When it is desired to give a glass sheet a nonplanar shape, for example during the manufacture of an automobile glazing, the planar sheet is brought to a temperature, and deformation is caused either by stressing the malleable lass to assume a rigid shape, or by positioning it horizontally and allowing it to become deformed under its own weight. Once the desired shape is obtained, a controlled cooling of the glass is carried out. The most recently employed cooling processes are tempering and annealing.

The first, which generally comprises energetically blowing on the glass, provides it, once cooled, with a prestressed state which increases its resistance to bending and thermal shock. This process is used typically for manufacturing of glazings which are to equip the sides or the rear of automobiles.

In annealing, on the other hand, the relaxation of stresses, is permitted by cooling the glass in a very gradual manner. In this case, an annealed glass is obtained whose stress level is slight in the direction of the thickness of the glass, which optionally allows the finished product to be cut and which, in the case of an automobile glazing, avoids explosive breakage in case by an impact of fine gravel. This technique is therefore particularly adapted to the manufacturing of windshields.

Also known is a technique where two sheets of superimposed glass which are simultaneously heated, bent and cooled are then assembled in pairs with a plastic sheet inserted therebetween.

In addition to tempering and annealing, it is known to blow cooler air on the periphery of glass sheets at the beginning of the cooling process to create in this peripheral zone a slight compression prestressing which limits the risks of later breakage. To carry out this blowing, one system uses blowing hoods which have a truncated pyramid shape. The air is guided by the walls of the hood and then escapes in a free passage between the edge of the hood and the glass. In the center, the air circulation is much slower: the heat exchange is therefore increased at the periphery.

In another system, instead of guiding the air only in a hood in the shape of a flared duct, a pyramidal deflector is put at the end of the hood which, while covering the central part of the glass sheet, allows the air to reach only its periphery. See, Lecourt et al U.S. Pat. No. 4,871,385. The pyramidal shape gives a precise direction to the air currents. To adapt the blowing to the different glass sheets, the process of Lecourt et al provides that, by adjusting the distance between the deflector and the hot glass sheet, the periphery of the glass is blown on preferentially to a more or less large central zone.

While Lecourt et al provides a system for prestressing the entire periphery of a glass sheet to varying degrees of width, by definition the Lecourt et al process is one that occurs at the beginning of the cooling process. It does not address the sagging problems which may occur during heating in the lehr, particularly that which occurs at top edge portions of bearing dark banding.

That is, in the manufacture of automobile glazing for some models of automobiles, it has become popular to paint or tint the periphery of the glass, particularly rear windows and sidelights, with a dark band. In the lehr, that dark edge band absorbs heat better and tends to be hotter than the central portion of the glass sheet and may therefore sag. In addition, as is known, the top edge portion of the glass (i.e. farthest away from the mechanism which moves the glass sheet through the lehr, whether a chain drive or otherwise) tends to run hotter than the rest of the glass and as such has a tendency to droop and contact the gas heart block, resulting in marred surfaces. When the top edge portion also bears dark banding, the problem is compounded. The wider the dark banding, the greater the problem.

Accordingly, the need exists for a method and apparatus to minimize during heating in the lehr undesirable sagging of portions of the glass sheet, particularly edge portions bearing bark banding.

SUMMARY OF THE INVENTION

That need is met by the method and apparatus of the present invention. The method of the present invention involves selectively cooling areas of a glass sheet, actually multiple glass sheets, as they are consecutively moved through a gas-fired glass sheet heating furnace (lehr) in order to minimize undesirable sagging of portions of the glass sheet which bear dark banding, particularly top edge portions of the automobile sidelights and rear windows which have been painted black around at least a portion of the periphery thereof. Because those areas tend to run hotter than the rest of the glass sheet, the method of the present invention is designed to selectively cool those areas so as to even out the temperature of the glass from top to bottom.

Thus, a glass sheet is placed on a gas hearth block of known design. Typically the gas hearth block holds the glass sheet 30–50 thousandths of an inch off of the upper surface of the block. If hot spots on the glass sheet develop those portions of the glass sheet may sag and touch the upper surface of the block, resulting in a defect.

Of course, the glass sheet is "hot" as it is moved through the lehr in that it is heated to approximately 1200° F. in the lehr in order to form and/or temper the glass sheet. By "hot spots" it is meant those areas, such as the top edge portion bearing dark banding, which are even hotter than the rest of the glass sheet due to nonuniform absorption of heat. Those are the areas which are desirably selectively cooled by blowing air, at a temperature cooler than the temperature to which the glass sheet has been heated, onto the hot spots. Preferably the air is room temperature air from a source of compressed air which is directed onto the hot spots through at least one air nozzle. Because that nozzle is located in the lehr, by the time the originally room temperature air is blown onto the hot spots, it is at approximate 150°–200° F. Still that is considerably cooler than the approximately 1200° F. temperature to which the glass sheet has been heated and will result in elimination of the hot spots. Thereafter, the glass sheets may be formed and/or tempered in the normal manner.

The apparatus of the present invention involves, within the lehr, a gas hearth block, or series of gas hearth blocks, having a large number of gas passages bored therethrough to form a gas support bed for the glass sheets. Examples of gas-support furnaces for heating glass may be seen in U.S. Pat. Nos. 3,223,501, 3,332,759 and 4,059,426, the disclosures of which are hereby incorporated by reference. As shown in those patents, the hearth block may also contain exhaust holes or have exhaust returns associated therewith and may have means to heat the gases directed through the hearth block as well as roof heaters so as to heat the glass sheet to approximately 1200° F. There is a drive means, such as a chain drive, for moving the glass sheet across the gas hearth block. At least one air nozzle is positioned over the selected area of the glass sheet to be selectively cooled (i.e. the hot spot). The air nozzle(s) is spaced approximately 0.5 to 2.0 from the upper surface of the glass sheet. Since the glass sheet is supported at a distance of approximately 30–50 thousandths of an inch from the gas hearth block and since the glass sheet may generally vary from 0.125 to 0.250 inches thick, the air nozzle(s) is accordingly spaced 0.655 to 2.30 from the surface of the gas hearth block. It may be made adjustable in that regard. The air nozzle(s) is connected to a source of compressed air maintained at room temperature. Finally, the apparatus may include a means for subsequently forming the glass sheet such as a jig or gas hearth block into which the heated glass sheet is placed, which jig or block may have a concave shape, and which shape the heated glass sheet will assume, followed by a cold air quench.

Thus, it is an object of the present invention to provide a method and apparatus for selectively cooling areas of glass sheets during heating in the lehr in order to minimize undesirable sagging of portions of the glass sheet which tend to develop hot spots; to provide a method and apparatus which is particularly useful in eliminating hot spots which may develop at the top edge portions of automobile rear windows and sidelights bearing dark banding; and to provide an easily-made modification to conventional lehrs, resulting in the apparatus of the present invention, which apparatus may be efficiently and cost effectively used to prevent defects in glass sheets caused by undesirable sagging.

Other objects and advantages of the invention will be apparent from the following description, the accompanying drawings and the appended claims.

DETAILED DESCRIPTION OF THE INVENTION

Figure 1:
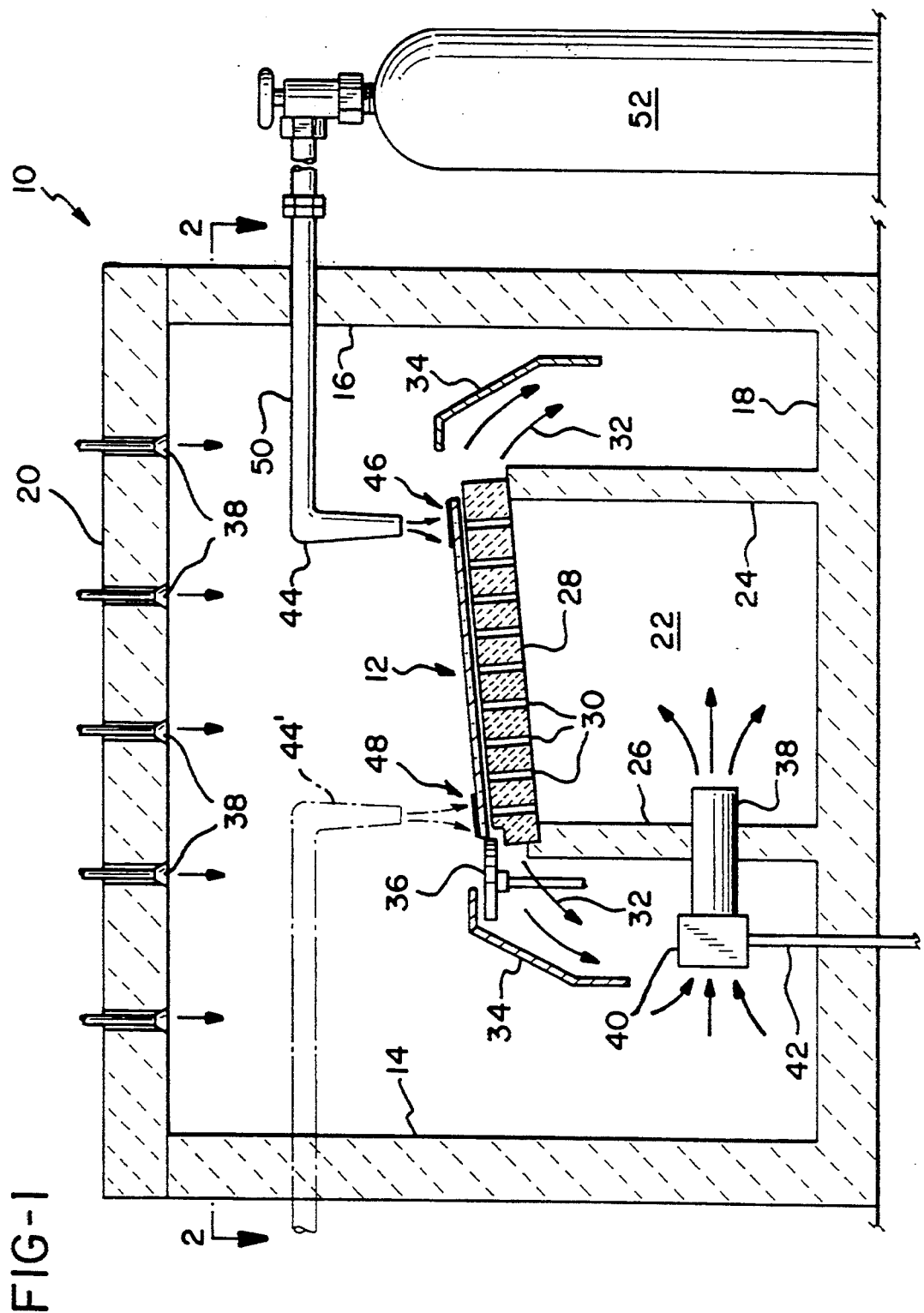
FIG. 1 is a transverse cross-sectional view of a lehr employing an air nozzle in accordance with the preferred embodiment of the present invention to minimize undesirable sagging of top edge portions of the glass sheet.
Figure 2:
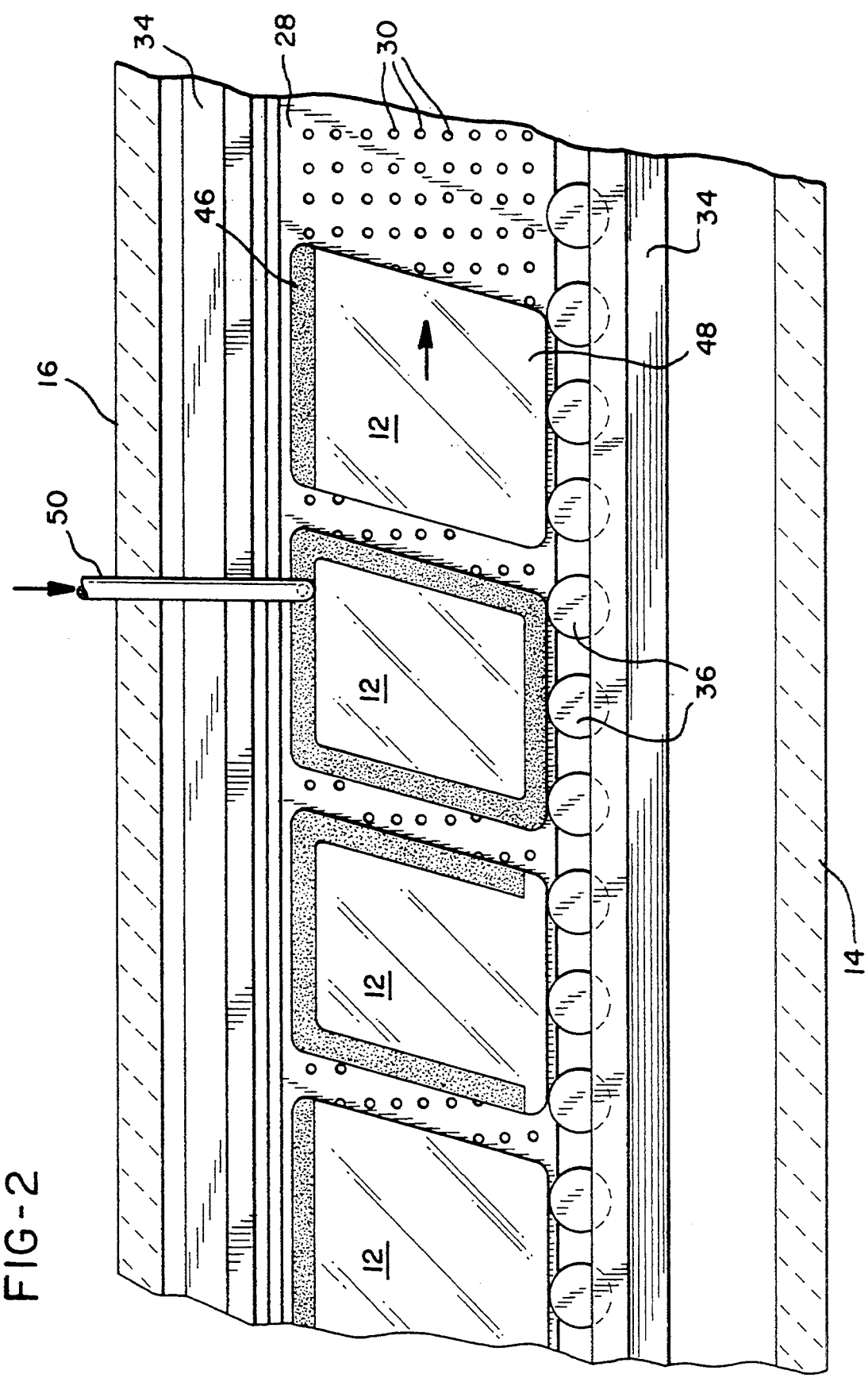
FIG. 2 is a longitudinal plan view of the lehr of FIG. 1 taken along line 2—2 in FIG. 1.

Referring to FIGS. 1 and 2, there is shown schematically one zone of a lehr 10 used for heating glass sheets 12 as they are continuously conveyed therethrough. Preferably glass sheets 12 have dark banding (such as black paint) on one or more peripheral edges (see FIG. 2). Most preferably glass sheets 12 are automobile sidelights on rear windows having dark banding around the full periphery.

Lehr 10 is a typical gas-fired glass sheet heating furnace having refractory walls 14 and 16, floor 18 and roof 20. Located within the lehr is a plenum chamber 22 defined by refractory slabs 24 and 26 and hearth block 28. Hearth block 28 has a large number of gas passageways 30 bored therethrough to form a gas support bed for glass sheets 12. Pressurized gas is forced upwardly through passageways 30 to heat the underside of glass sheets 12 and support glass sheets 12 on a layer of gas. The gas escapes from the space between hearth block 28 and glass sheets 12 through exhaust holes (not shown) and internal cross bores (also not shown) which provide for air escape as shown by arrows 32, guided by baffles 34. Hearth block 28 may be tilted at a slight angle from horizontal to cause the bottom edges of glass sheets 12 to bear against drive means 36. Drive means 36 may be chain or shaft driven and may have fingers adapted to catch the corner of each glass sheet to position, guide and drive it through the lehr from left to right (see FIG. 2).

In the embodiment shown in FIGS. 1 and 2, the primary source of energy in the furnace is the conventional combustion of gaseous fuels by means of a plurality of roof burners 38. The hot gases are circulated in the lehr to heat glass sheets 12 to a temperature of approximately 1200° F. Conduit 38 is used to direct the hot gases into the plenum. Unit 40 may include a blower for maintaining the desired air pressure in the plenum. Unit 40 may also contain an auxiliary electrical heating element. Alternatively, unit 40 may simply be conduit for already heated gas under pressure provided from a source (not shown) through pipe 42. In another embodiment, the primary means for heating glass sheets 12 may be electrical or radiant heating elements used in place of roof burners 38. Further details of the overall construction and operation of this type of lehr are not necessary for an understanding of the present invention and the present invention may be used with other types of glass sheet heating furnaces.

That is, the present invention is one designed to eliminate the formation of hot spots no matter how the glass sheets are heated. Thus, a key to the present invention is use of at least one air nozzle 44 to blow air at a cool temperature (at approximately 150°–200° F.) onto selected areas of glass sheet 12 to eliminate hot spots and to minimize undesirable sagging. As shown in FIGS. 1 and 2, air nozzle 44 is directed at the top edge portion 46 of glass sheets 12. As also shown that top edge portion 46 bears dark banding. As mentioned previously, that is one of the most common locations for hot spots to exist in this type of glass sheet heating system with these types of glass sheets. In another embodiment a second air nozzle 44' (shown in phantom in FIG. 1) may be used in addition to air nozzle 44 to blow cooler air on the bottom edge portion 48 of glass sheets 12. Other numbers and locations for air nozzles may be used, depending on where hot spots are formed.

As shown in FIG. 1, air nozzle 44 is connected via pipe 50 to compressed air tank 52, which serves as a source of room temperature compressed air. Alternatively a compressor (not shown) may be used to supply room temperature to air pipe 50 and therethrough to air nozzle 44. As also shown in FIG. 1, air nozzle 44 is fixedly positioned on pipe 50. Both are positioned so that air nozzle 44 will be fixed approximately 0.5" to 2.0" above the surface of glass sheet 12. Alternatively, air nozzle 44 may be adjustably fixed to pipe 50 so that it may be raised or lowered as desired. As a still further alternative air nozzle 44 may be releasably connected to pipe 50 so that it may be replaced with an air nozzle of different length, width, diameter, or shape in order to blow air in the most efficacious manner onto selected areas of glass sheets 12.

In any event, the blowing of cooler air from air nozzle 44 and/or air nozzle 44' onto selected areas of the glass sheets 12 during heating in the lehr will eliminate hot spots and minimize undesirable sagging of portions of the glass sheets 12. The glass sheets 12 may thereafter be formed in the normal manner, as is done for example with automobile rear windows. Thus a jig may be used or a gas hearth block having a concave shape may be located at the downstream end of hearth block 28 shown in FIG. 2 so that the uniformly heated glass sheets become deformed under their own weight and conform to the shape of the jig or shaped block. Thereafter, the formed glass sheets may be quenched in a quenching chamber by blowing a blast of cold air onto the glass sheet, as is known in the art. When the ultimately desired shape of the glass sheets is a flat shape, such as for an automobile sidelight, the lehr is simply used as a part of the tempering (heating followed by quenching) process. No forming as such takes place. Still, the same problems with formation of hot spots and undesirable sagging exist. As will be apparent, the present invention may be used with either system.

Having thus described the method and apparatus for selectively cooling areas of glass sheets of the present invention in detail and by reference to the preferred embodiments thereof, it will be apparent that modifications and variations are possible without departing from the scope of the invention defined in the appended claims.

What is claimed is:

1. A method for selectively cooling areas of a glass sheet during heating to minimize undesirable sagging of selected areas of the glass sheet, comprising:
   providing a glass sheet on a gas hearth block,
   heating said glass sheet, and
   blowing air, at a temperature cooler than the temperature to which said glass sheet has been heated, onto selected areas of said glass sheet,
   whereby undesirable sagging of said selected areas of said glass sheet is minimized.

2. The method of claim 1 wherein said glass sheet has dark bands on edge portions thereof and wherein said selected areas onto which said cooler air is blown include at least portions of said dark bands.

3. The method of claim 2 wherein said cooler air is blown onto said selected areas from at least one air nozzle.

4. The method of claim 3 wherein said at least one air nozzle is held 0.5" to 2.0" from the upper surface of said glass sheet.

5. The method of claim 3 wherein said cooler air is in the range of from approximately 150° to 200° F.

6. The method of claim 5 wherein said cooler air is supplied to said at least one air nozzle from a source of compressed air.

7. The method of claim 5 wherein said glass sheet is heated to approximately 1200° F.

8. The method of claim 1 further including the step of forming said glass sheet after said cooler air is blown onto selected areas of said sheet.

* * * * *